US012442228B2

(12) United States Patent
Dallman

(10) Patent No.: US 12,442,228 B2
(45) Date of Patent: Oct. 14, 2025

(54) FLEX DRIVE TIE-BAR WINDOW LOCK SYSTEM

(71) Applicant: Truth Hardware Corporation, Owatonna, MN (US)

(72) Inventor: Brian Dallman, Owatonna, MN (US)

(73) Assignee: TRUTH HARDWARE CORPORATION, Owatonna, MN (US)

( * ) Notice: Subject to any disclaimer, the term of this patent is extended or adjusted under 35 U.S.C. 154(b) by 345 days.

(21) Appl. No.: 17/959,905

(22) Filed: Oct. 4, 2022

(65) Prior Publication Data

US 2023/0103533 A1 Apr. 6, 2023

Related U.S. Application Data

(60) Provisional application No. 63/251,725, filed on Oct. 4, 2021.

(51) Int. Cl.

*E05C 9/02* (2006.01)
*E05C 9/18* (2006.01)
*E05C 9/22* (2006.01)

(52) U.S. Cl.

CPC ............ *E05C 9/028* (2013.01); *E05C 9/1808* (2013.01); *E05C 9/185* (2013.01); *E05C 9/22* (2013.01)

(58) Field of Classification Search

CPC ......... Y10T 292/0824; Y10T 292/0834; E05C 9/1858; E05C 9/1808; E05C 9/1855; E05C 9/22; E05C 9/028; Y10S 292/20; Y10S 292/47

See application file for complete search history.

(56) References Cited

U.S. PATENT DOCUMENTS 7,452,014 B2 * 11/2008 Vetter ................. E05B 17/0025 292/DIG. 20
2016/0130847 A1 * 5/2016 Gramstad ............. E05C 9/1833 49/394

* cited by examiner

*Primary Examiner* — Gilbert Y Lee
*Assistant Examiner* — Yahya Sidky
(74) *Attorney, Agent, or Firm* — Bradley J. Thorson; DeWitt LLP

(57) ABSTRACT

A tie bar fabricate from extruded or formed polymer material available in bulk rolls, and methods of fabrication for a tie bar assembly. The tie bar is custom cut from the bulk material to any desired length at a window assembly line, and is cut with saddles and apertures that match the locations of window locking points and drive locations to conform with window designs on the fly. Standard locking points and drive pins are fitted onto the tie bar in locations as needed to fit particular configurations, and are slidable in standard c-shaped channels. The polymer material used for the tie bar is flexible and resilient, thereby lending itself to use for rounded window designs, without having any specific preformed length, locking point location, or shape.

8 Claims, 5 Drawing Sheets

FLEX DRIVE TIE-BAR WINDOW LOCK SYSTEM

RELATED APPLICATION

The present application claims the benefit of U.S. Provisional Application No. 63/251,725 filed Oct. 4, 2021, said application being hereby incorporated herein in its entirety by reference.

TECHNICAL FIELD

The present invention relates to multi-point sash locks for casement windows, and more specifically, to tie bars for multi-point casement window sash lock mechanisms.

BACKGROUND

Multi-point sash lock systems for casement windows are well known and are commonly provided for security, to inhibit water entry and air infiltration in the window, and enhance structural performance. These systems typically have a single operating control, usually a lever. The operating control is linked to a tie bar mounted on the window frame that allows activation of remote locking points in addition to the main locking point. Operation of the lever causes the tic bar to move longitudinally, usually vertically along the long axis of the window, so that locking points on the tie bar engage keepers on the sash to inhibit opening of the sash. Tie bar guides, or "euro groove" tracks, are used to secure the tie bar to the frame of the window, preventing, transverse movement of the tie bar while enabling the tie bar to move longitudinally, Such a multi-point lock mechanism is described and depicted in U.S. Pat. No. 7,452,014, hereby fully incorporated herein by reference in its entirety.

Prior tie bar assemblies have generally been manufactured from metal in certain standard lengths, corresponding to the heights of windows manufactured by window makers. These tie bars typically range in length from 12 inches to 72 inches, and have various numbers of attached locking points located at positions on the tie bar corresponding to the keeper location designed into the window. A drawback of this approach is that a large number of different tie bar configurations is required, which need to be made and stocked by a window hardware manufacturer, and kept in inventory by a window maker.

Also, when it comes to rounded top window configurations, commonly used metal tie bars need to have a section pre-formed that closely matches the rounded geometry of the window. This leads to a great number of parts that specifically match the various window designs that may be employed by window manufacturers. The logistics involved with supplying all the application specific parts to a window assembly line when, and only when, needed, leads to inefficiencies and increased costs of window manufacture. In addition, the limited availability of parts limits custom window designs to only those supported by the configurations available in multi-point locking hardware. What is needed in the industry is a multi-point lock mechanism for casement windows that addresses the deficiencies in prior art designs.

SUMMARY OF THE DISCLOSURE

Embodiments of the present invention address the need in the industry for a multi-point lock mechanism for casement windows that overcomes the drawbacks of prior art designs.

In an embodiment, the invention includes a tie bar that can be fabricated from extruded or formed polymer material available in bulk rolls. The tie bar can be custom cut from the bulk material to any desired length at a window assembly line, and can be cut with saddles and apertures that match the locations of window locking points and drive locations to conform with window designs on the fly. Standard locking points and drive pins can be fitted onto the tie bar m locations as needed to fit particular configurations, and are slidable in standard c-shaped channels. The polymer material used for the tie bar is flexible and resilient, thereby lending itself to use for rounded window designs, without having any specific preformed length, locking point location, or shape.

Accordingly, in an embodiment, a method of making a multi-point window locking mechanism tie bar includes cutting a section of flexible and resilient polymer material from a roll, the section having a predetermined length, punching a plurality of spaced-apart apertures in the section along a longitudinal axis of the section, and cutting a notch in the section along the longitudinal axis of the section at a location between the spaced-apart apertures, the notch adapted to receive a saddle, with the saddle having either a projecting locking point or a projecting drive pin. The method can further include engaging the saddle with the notch to secure the saddle to the section, and providing a c-shaped track, and slidably engaging the saddle in the track.

In further embodiments, the invention includes a method of making a window assembly wherein the window assembly has a frame defining an opening and a sash operably coupled to the frame, the sash selectively shiftable between a closed position wherein the sash closes the opening, and an open position wherein the sash is spaced apart from the frame. The window assembly includes a multi-point locking mechanism to secure the sash in the closed position, and the method includes fabricating a tie bar of the multi-point locking mechanism by cutting a section of flexible and resilient polymer material from a roll, the section having a predetermined length, punching a plurality of spaced-apart apertures in the section along a longitudinal axis of the section, and cutting a notch in the section along the longitudinal axis of the section at a location between the spaced-apart apertures. The notch is adapted to receive a saddle, the saddle having either a projecting locking point or a projecting drive pin. The saddle is engaged with the notch to secure the saddle to the section, and a c-shaped track is secured to the frame, the saddle being slidably engaged in the track. In embodiments, the c-shaped track is secured to the frame by inserting fasteners through plurality of spaced-apart apertures in the tie bar. A second notch can be cut in the section, and the saddle engaged with the second notch.

In further embodiments, the invention includes a window locking mechanism for a window assembly. The assembly has a frame defining an opening and a sash operably coupled to the frame. The sash is selectively shiftable between a closed position wherein the sash closes the opening, and an open position wherein the sash is spaced apart from the frame. The window locking mechanism includes a tie bar, at least a section of the tie bar being made from flexible, resilient, polymer material, the section being operably coupled with a saddle presenting a locking point or a drive point, and a c-shaped track, the saddle being slidably engaged with the c-shaped track.

The summary above is not intended to describe each illustrated embodiment or every implementation of the present disclosure. The figures and the detailed description that follow more particularly exemplify these embodiments.

BRIEF DESCRIPTION OF THE DRAWINGS

Subject matter hereof may be more completely understood in consideration of the following detailed description of various embodiments in connection with the accompanying figures, in which.

Figure 1:
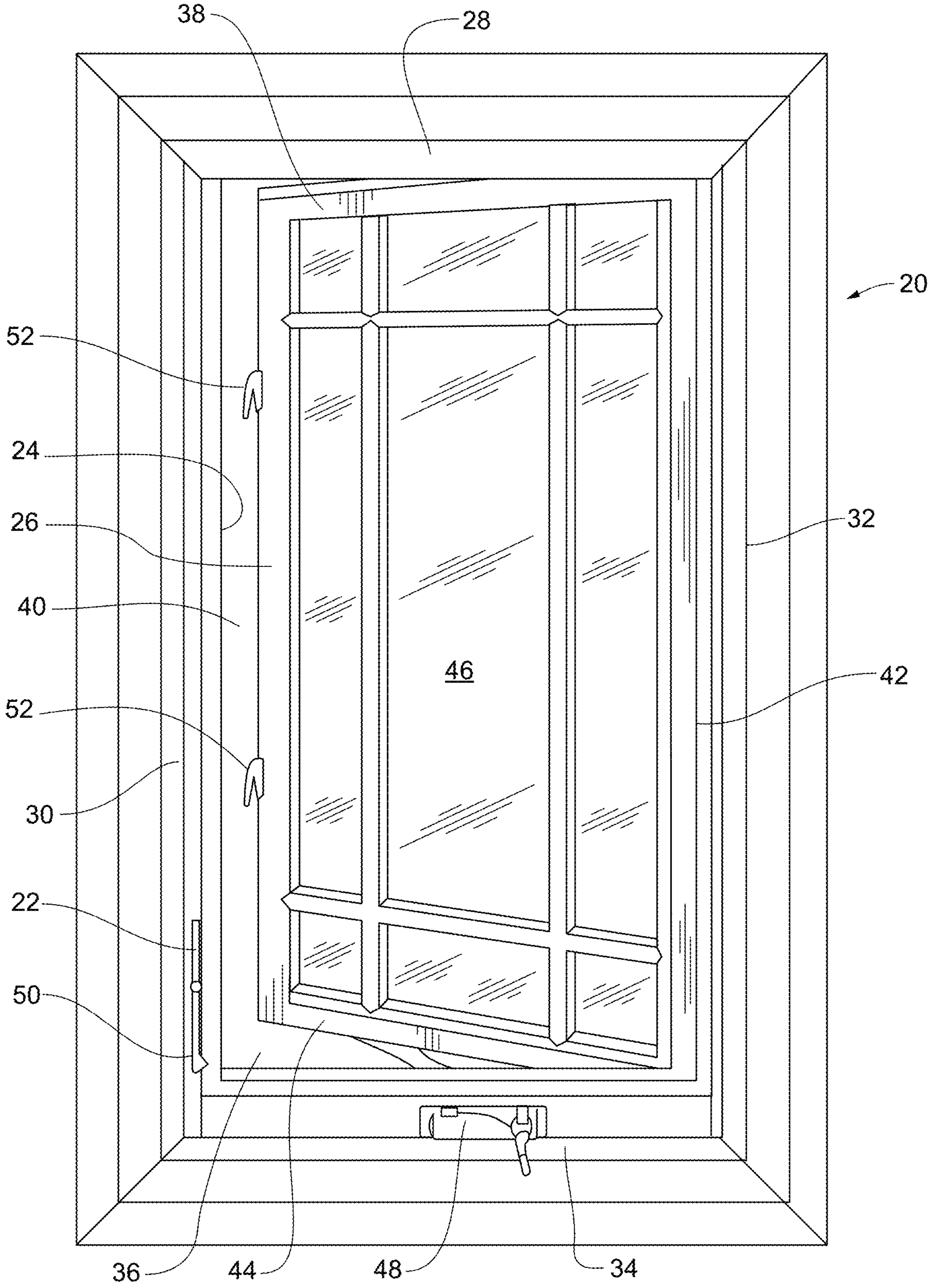
FIG. 1 is an isometric view of a casement window assembly with a multi-point lock tie bar assembly according to an embodiment of the invention.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

Figure 2:
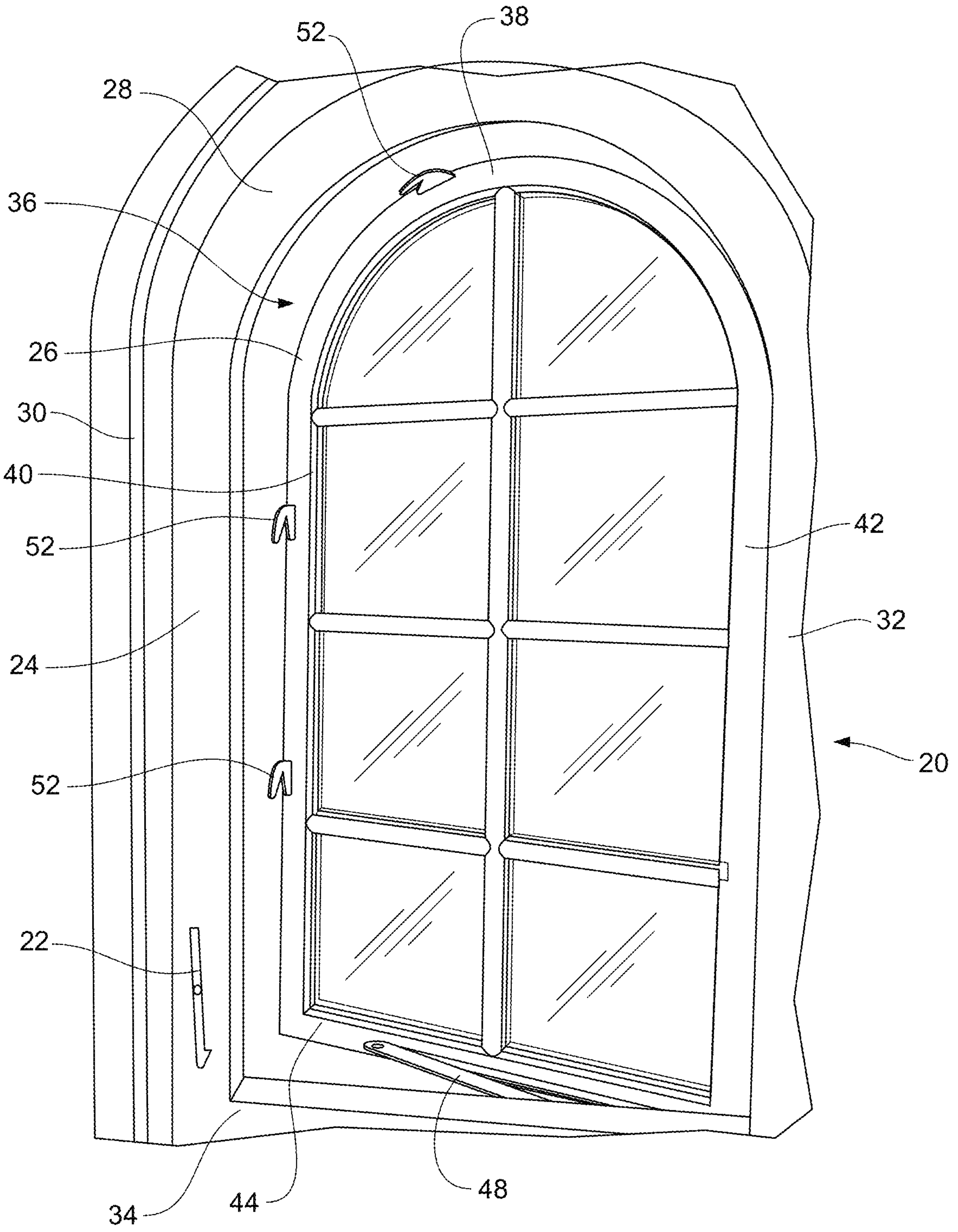
FIG. 2 is a perspective view of a round top casement window with a multi-point lock tie bar assembly according to an embodiment of the invention.
Figure 3:
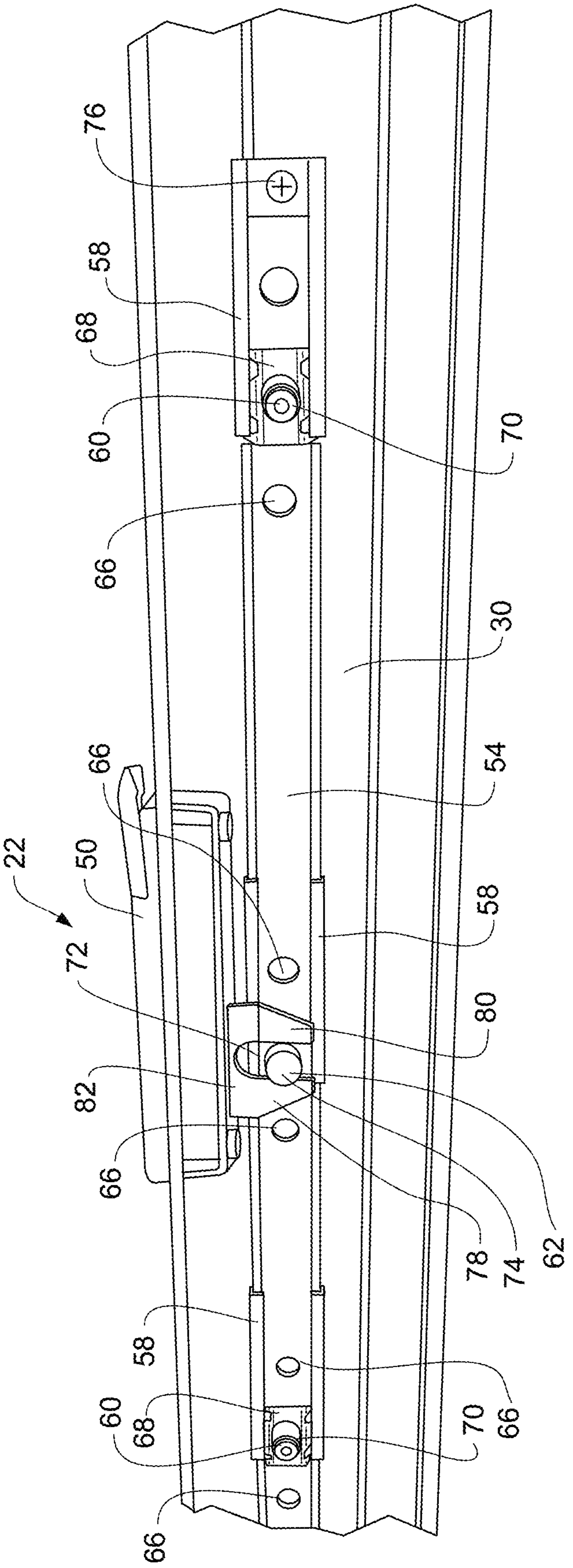
FIG. 3 is perspective view of the tie bar assembly installed on a window frame profile.
Figure 4:
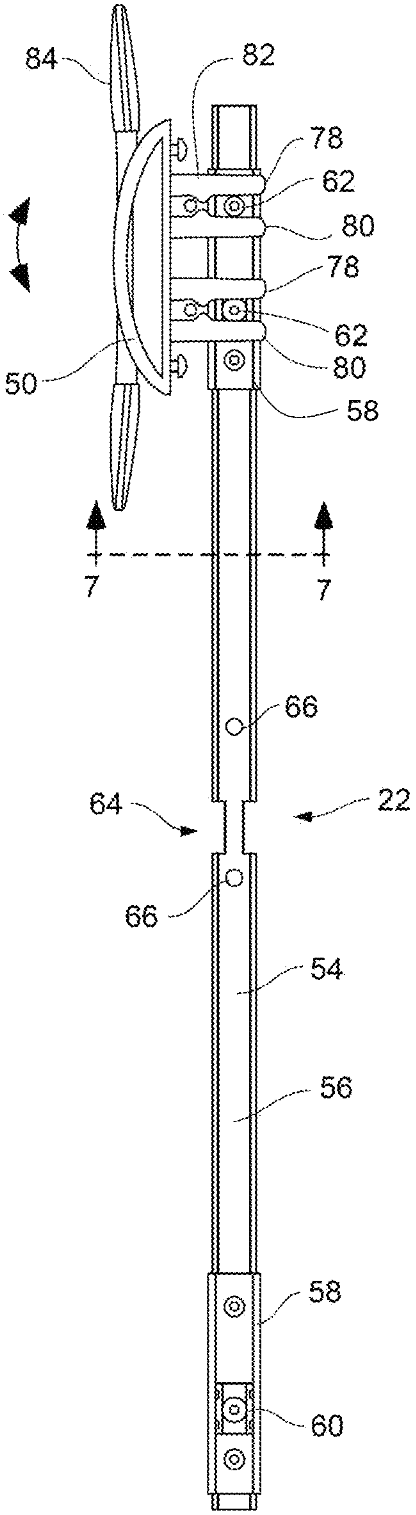
FIG. 4 is an elevation view of the tie bar assembly of FIG. 3 with a different handle assembly.
Figure 5:
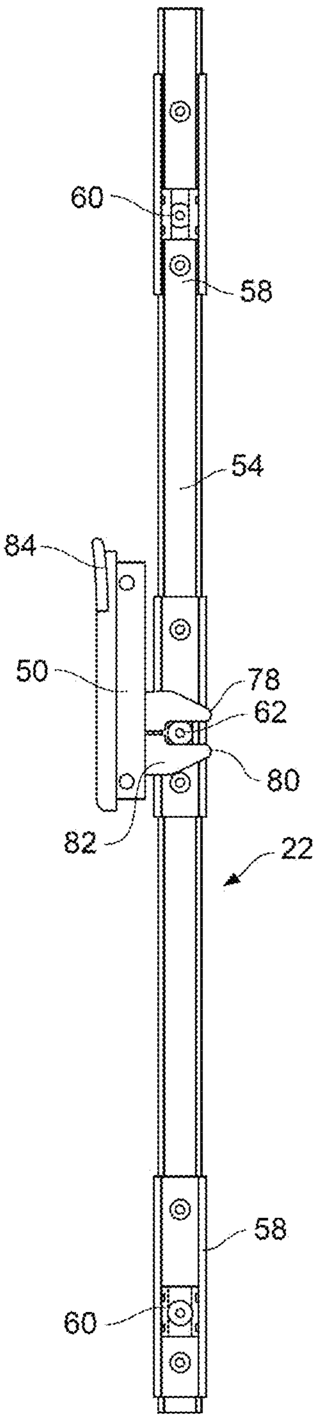
FIG. 5 is an elevation view of the tie bar assembly of FIG. 3.

In FIGS. 1 and 2 there is depicted a casement window assembly 20 incorporating a multi-point lock mechanism 22 with a tie bar assembly according to an embodiment of the invention. Casement window assembly 20 generally includes frame 24 and sash 26. Frame 24 generally includes head jamb 28, which can be rounded as depicted in FIG. 2, side jambs 30, 32, and bottom jamb 34, defining opening 36. Sash 26 generally includes top stile 38, side stiles 40, 42, bottom stile 44, and retains glazing 46. Sash 26 is hinged to frame 24 with hinges (not depicted) at the top and bottom so that sash 26 can be swung to open and close opening 36, using operator 48. As depicted, the tie bar assembly of multi-point lock mechanism 22 is typically concealed within side jamb 30, except for control handle assembly 50 which is visible on frame 24, and keepers 52 which are visible on sash 26.

As depicted in FIGS. 3-6, multi-point lock mechanism 22 generally includes lever-type control handle assembly 50 and tie bar assembly 54. Control handle assembly 50 can be a “lost motion” type mechanism, such as described in U.S. Pat. No. 7,452,014 previously incorporated herein by reference, or any other suitable lever actuation mechanism. Tie bar assembly 54 generally includes tie bar 56, tracks 58, locking points 60, and one or more drive pin points 62.

According to embodiments of the invention, tie bar 56 can be fabricated from Technoform® extruded polyamide, glass fiber reinforced, flexible and resilient drive rod which is available in bulk rolls. It will be appreciated, however, that other bulk flexible and resilient polymer drive rod materials can be used while remaining within the scope of the invention. Tie bar 56 can be custom cut from the bulk material to any desired length using a stamp and cutoff machine which may be, for a non-limiting example, a Giesse® Model PA009 Semi-Automatic Punching Machine, at the point of window assembly. Moreover, notches 64 and apertures 66 can be cut with the same machine at any desired locations along tie bar 56, corresponding to desired locations of locking points 60 and drive pins 62.

Figure 6A:
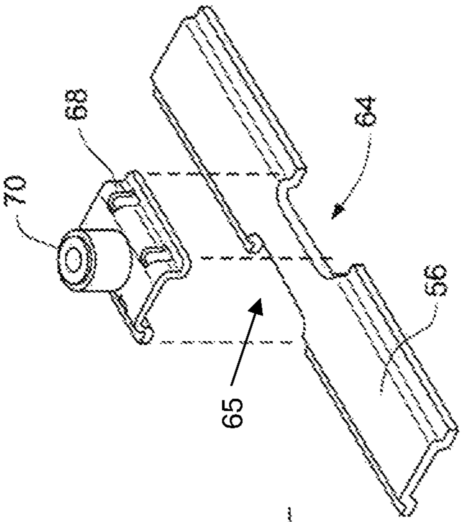
FIG. 6A is a partial isometric view of the locking point portion of the tie bar assembly of FIG. 3.
Figure 6:
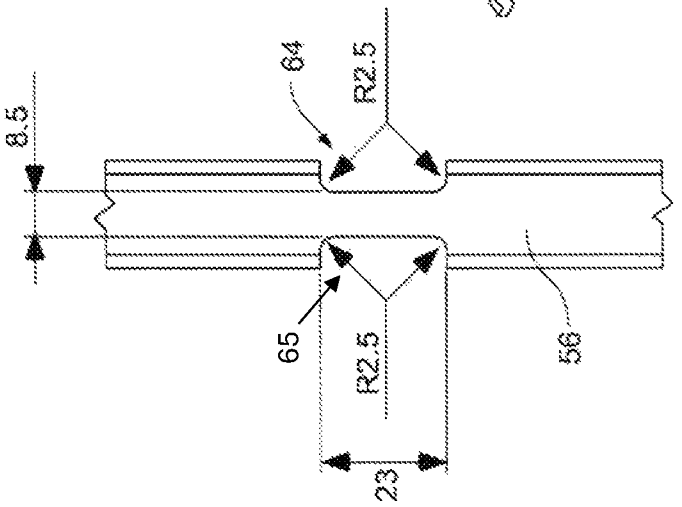
FIG. 6 is a partial view of a locking point portion of the tie bar assembly of FIG. 3.

As depicted in FIGS. 6 and 6A, locking points 60 generally include saddle 68, engaged with notches 64, 65, and projecting pin or roller 70. Similarly, drive pin points 62 generally include saddle 72 and projecting pin or roller 74. Saddles 68, 72, are received by notches 64, 65, as depicted in FIGS. 6 and 6A, fixing saddles 68, 72, and pin or rollers 70, 74, respectively, to tie bar 56.

Figure 7:
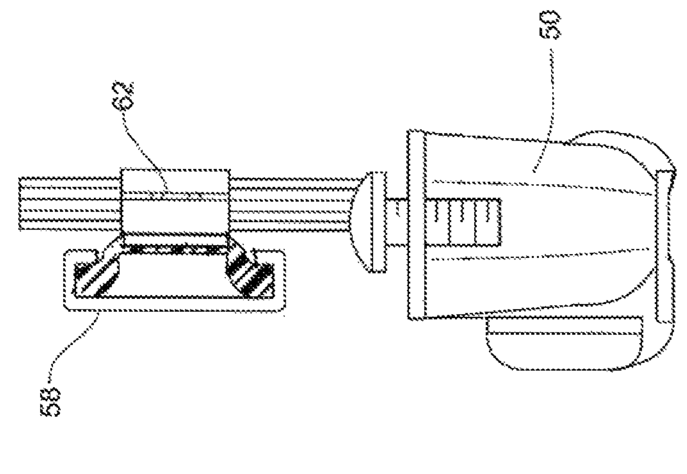
FIG. 7 is a sectional view of the tie bar assembly of FIG. 3 taken at section 7-7 on FIG. 4.

Tracks 58, which are preferably made from a corrosion resistant material such as stainless steel or a polymer, have a generally c-shaped cross section as depicted in FIG. 7, and slidably receive saddle 68 or saddle 72 therein. Tracks 58 are secured to side jamb 30 or 32 with fasteners 76, which can be inserted and secured through apertures 66 with tie bar 56 disposed in a desired position. Projecting pins or rollers 74 are received between prongs 78, 80, of carriage 82 of control handle assembly 50.

In operation, lever 84 of control handle assembly 50 can be operated, causing carriage 82 to vertically shift. As it shifts, carriage 82 slides vertically and drives pin points 62 vertically in the corresponding track 58, and because of the fixed connection of drive pin points 62 with tie bar 56, tie bar 56 shifts vertically, guided by tracks 58, causing projecting pins or rollers 70 to engage or disengage from keepers 52, and thereby locking or unlocking sash 26 from frame 24. It will be appreciated that the flexible and resilient qualities of the material used for tie bar 56 enables tie bar 56 to bend around the rounded top profile of windows such as depicted in FIG. 2 without becoming permanently deformed. Also, the bulk nature of the material means that the material is easily available, and not limited to particular length dimensions as would be the case with typical metal tie bars. The ability to easily cut sections of tic bar 56 to varying length depending on the particular window design under assembly at the point of assembly, and cut saddles 64 and apertures 66 in tie bar 56 corresponding to the location of locking points 60 and drive pin points 62 at the same time, along with the interchangeability of the locking points 60 and drive pin points 62, means that it is not necessary for a window manufacturer, or a window hardware supplier to stock, and hold in inventory, multiple lengths of tie bars 56 with varying lock point and drive pin point locations depending on particular dimensions of window design, and more easily enables custom window and lock configurations. Various embodiments of systems, devices, and methods have been described herein.

These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the Subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected, from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims for the present invention, it is expressly intended that the provisions of 35 U.S.C. § 112(f) are not to be invoked unless the specific terms "means for" or "step for" are recited in the subject claim.

What is claimed is:

1. A method of making a multi-point window locking mechanism tie bar, comprising:

cutting a section of flexible and resilient polymer material from a roll, the section having a predetermined length;

punching a plurality of spaced-apart apertures in the section along a longitudinal axis of the section;

cutting a first notch in the section along the longitudinal axis of the section at a location between the spaced-apart apertures, the first notch adapted to receive a saddle, the saddle having either a projecting locking point or a projecting drive pin; and providing a track having a c-shaped cross-section, and slidably engaging the saddle in the track, the track adapted to be secured to a window frame by inserting fasteners through the plurality of spaced-apart apertures in the tie bar.

2. The method of claim 1, further comprising engaging the saddle with the first notch to secure the saddle to the section.

3. The method of claim 1, wherein a second notch is cut in the section.

4. The method of claim 3, wherein the saddle is engaged with the first and second notches.

5. The window locking mechanism of claim 3, wherein the section has a pair of opposing notches, the saddle being engaged with the pair of notches.

6. A method of making a window assembly, the window assembly having a frame defining an opening and a sash operably coupled to the frame, the sash selectively shiftable between a closed position wherein the sash closes the opening, and an open position wherein the sash is spaced apart from the frame, the window assembly including a multi-point locking mechanism to secure the sash in the closed position, the method comprising:

fabricating a tie bar of the multi-point locking mechanism by cutting a section of flexible and resilient polymer material from a roll, the section having a predetermined length, punching a plurality of spaced-apart apertures in the section along a longitudinal axis of the section, and cutting a first notch in the section along the longitudinal axis of the section at a location between the spaced-apart apertures, the notch adapted to receive a saddle, the saddle having either a projecting locking point or a projecting drive pin;

engaging the saddle with the first notch to secure the saddle to the section; and securing a track having a c-shaped cross-section to the frame, the saddle being slidably engaged in the track, wherein the track is secured to the frame by inserting fasteners through the plurality of spaced-apart apertures in the tie bar.

7. The method of claim 6, wherein a second notch is cut in the section, and the saddle is engaged with the second notch.

8. A window locking mechanism for a window assembly, the assembly having a frame defining an opening and a sash operably coupled to the frame, the sash selectively shiftable between a closed position wherein the sash closes the opening, and an open position wherein the sash is spaced apart from the frame, the window locking mechanism comprising:

a tie bar, at least a section of the tie bar being comprised of flexible, resilient, polymer material, the section being operably coupled with a saddle presenting a locking point or a drive point, the section having a plurality of spaced-apart apertures disposed along a longitudinal axis of the section; and a track having a c-shaped cross-section, the saddle being slidably engaged with the track, the track adapted to be secured to the frame by inserting fasteners through the plurality of spaced-apart apertures in the tie bar.

* * * * *